United States Patent [19]
Do et al.

[11] Patent Number: 5,944,865
[45] Date of Patent: Aug. 31, 1999

[54] APPARATUS FOR FABRICATING AN OPTICAL FIBER COATED WITH METAL AND METHOD THEREFOR

[75] Inventors: Mun-Hyun Do, Gumi; Tea-San Jeong, Suwon, both of Rep. of Korea; E. M. Dianov; V. A. Bogatyrjov, both of Moscow, Russian Federation

[73] Assignee: SamSung Electronics Co., Ltd., Kyungki-do, Rep. of Korea

[21] Appl. No.: 08/847,611

[22] Filed: Apr. 25, 1997

[30] Foreign Application Priority Data

Apr. 25, 1996 [KR] Rep. of Korea ............... 96-12918

[51] Int. Cl.⁶ ............ C03B 37/07; C03C 25/04; C03C 25/02
[52] U.S. Cl. ............ 65/381; 65/382; 65/431; 65/484; 65/491; 65/529
[58] Field of Search ............ 65/377, 381, 382, 65/384, 431, 484, 491, 529

[56] References Cited

U.S. PATENT DOCUMENTS

| | | |
|---|---|---|
| 1,477,680 | 6/1923 | Slaughter et al. . |
| 4,123,242 | 10/1978 | Imoto et al. . |
| 4,390,589 | 6/1983 | Geyling et al. . |
| 4,402,993 | 9/1983 | Aisenberg et al. . |
| 4,407,561 | 10/1983 | Wysocki . |
| 4,418,984 | 12/1983 | Wysocki et al. . |
| 4,485,122 | 11/1984 | Williams et al. ............ 65/43 |
| 4,514,205 | 4/1985 | Darcangelo et al. ............ 65/491 |
| 4,824,455 | 4/1989 | Rand et al. . |
| 4,853,258 | 8/1989 | Gombert et al. . |
| 4,948,406 | 8/1990 | Kornmann . |
| 5,497,442 | 3/1996 | Roos et al. . |

FOREIGN PATENT DOCUMENTS

| | | |
|---|---|---|
| 0076575 | 4/1983 | European Pat. Off. . |
| 0095729 | 12/1983 | European Pat. Off. . |
| 25 56 786 | 7/1976 | Germany . |
| 2151369 | 7/1985 | United Kingdom . |
| WO 82/01365 | 4/1982 | WIPO . |
| WO 82/01543 | 5/1982 | WIPO . |

OTHER PUBLICATIONS

Simpkins, P, *Electronics Letters*, Apr. 27, 1995, vol. 31 No. 9 pp. 747–749.

Bogatyrjov, VA, *Sov Lightwave Commun*, 1991, 1, pp 227–234 esp 227–8, 'Super high strength, hermetic metal coated optical fibers', UK.

Technical Staff of CSELT (publisher), *Fiber Optic Communications Handbook*, 1990, pp. 99–110.

*Primary Examiner*—Stanley S. Silverman
*Assistant Examiner*—Jacqueline A. Ruller
*Attorney, Agent, or Firm*—Robert E. Bushnell, Esq.

[57] ABSTRACT

An apparatus for fabricating an optical fiber coated with metal, constructed with a crucible for melting the optical fiber preform to draw an uncoated optical fiber, a diameter measuring device for measuring the diameter of the uncoated optical fiber to regulate it, a metal coater for coating the uncoated optical fiber with metal to prevent penetration of moisture, a temperature controller for controlling the inside temperature of the metal coater, a postcooler for cooling the metaled optical fiber from a high temperature, a capstan for drawing the optical fiber from the optical fiber preform by applying a rotational force against a portion of the metaled optical fiber, and a spool for winding the metaled optical fiber. The metaled optical fiber includes a core for transmitting light, a cladding on the core having lower refractive index than the core, and a metal coating formed on the cladding for preventing penetration of moisture.

42 Claims, 3 Drawing Sheets

APPARATUS FOR FABRICATING AN OPTICAL FIBER COATED WITH METAL AND METHOD THEREFOR

CLAIM FOR PRIORITY

This application makes reference to, incorporates the same herein, and claims all benefits accruing under 35 U.S.C. §119 from our application entitled Apparatus For Fabricating An Optical Fiber Coated With Metal And Method Therefor earlier filed in the Korean Industrial Property Office on the 25th day of the month of April 1996, and there duly assigned Serial No. 12918/1996.

BACKGROUND OF THE INVENTION

1. Field of the Invention

The present invention generally pertains to optical fibers, and more particularly, to an apparatus and a process for fabricating an optical fiber coated with metal and method therefor.

2. Description of the Related Art

Generally, an optical fiber composed of silica glass and used for communication has a diameter of about 100 μm to 150 μm, and therefore typically is covered with a reinforcement coating in order to prevent abrasion, corrosion, and inadvertent fracture. Theoretically such an optical fiber has a high strength over 14 GPa. If contacted by moisture, however, the fiber is prone to become highly fragile: the moisture tends to enter any minute cracks exposed on the surface of the glass, where it causes the glass to corrode. Because cracks in glass occur at points of intrinsic or externally induced stress, the presence of corrosion at these points inevitably leads to growth of the cracks. As these flaws become more numerous and extend more deeply into the fiber body, the likelihood increases that even a small additional stress, if applied near such a flaw, will cause in the fiber a catastrophic fracture. Optical fibers used for many types of applications therefore require a protective coating to protect the surface of the optical fiber from abrasion, to enhance the tensile and bending strength, and to prevent moisture penetration.

An optical fiber intended for use in field applications, such as for communications transmission lines, typically has its lateral surface covered with a reinforcement coating of a suitable material. Such materials include ceramics and plastic resins, but each of these material types include disadvantages. Ceramics, for example, require expensive equipment to apply them to an optical fiber and tend to have excessive hardness, which can itself damage the fiber. Plastic resins are relatively soft and inexpensive to apply, but the usual varieties (such as acrylic or silicone) may both contain moisture and permit moisture to permeate to the glass surface.

A metal coating has several advantages over ceramics and plastic resins. Metals may be applied with inexpensive machinery, much as plastic resins, but they contain no moisture and provide an impervious moisture barrier. Metal coatings also can provide a high-strength reinforcement to the fiber while having sufficient flexibility to maintain their barrier integrity through substantial bending operations. In addition, a metal-coated optical fiber will retain adequate strength over a substantial usable lifetime, even when subjected to harsh conditions such as high-temperature environments. A metal coating on an optical fiber can also serve, in appropriate situations, as an effective and cost-efficient conductor of electrical signals.

Certain problems also arise from the use of metal coatings. First, some metals tend to react with the glass or cause other undesirable effects when applied in direct contact with a fiber surface. An undercoating of plastic resin could mitigate some of these effects, but the high temperature of molten metals tends to substantially degrade most polymers. Certain metal alloys can be applied in slurry form, at temperatures substantially lower than required for molten metals, but the advantages of a pure elemental metal coating are thereby lost.

Use of molten metal makes the production of a coating with uniform thickness difficult, due to the low viscosity of suitable molten metals. This low viscosity means that rapid movement of the fiber through the molten metal generates turbulence in the metal. Existing methods to prevent this turbulence involve complex additional equipment that increases the cost of coated fiber fabrication. Finally, a metal coating should be substantially cooled before the fiber is wound for storage, but rapid cooling may create flaws such as internal stresses and other undesirable effects in the finished fiber product.

Several approaches to solving the problems accompanying fabrication of metal coatings on optical fibers have met with degree of success. U.S. Pat. No. 4,390,589, issued to Geyling et al., discloses an apparatus and method for coating optical fibers with metal by means of a multiphase alloy bath maintained in a slurry state. Such multiphase alloys have an initial melting temperature substantially below the melting temperatures of the metal constituents of the alloy, and therefore they can be applied successfully as metal coatings over a polymer undercoating. In addition, these alloys have a relatively high effective viscosity that permits immersion of a rapidly-moving fiber without the onset of turbulence. On the other hand, multiphase alloys suitable for this slurry process have relatively low initial melting temperatures that render them unsuitable for coatings on optical fibers to be subjected to extremely high temperature conditions. Moreover, use of an alloy for the metal coating of an optical fiber necessarily sacrifices the advantages provided by a coating of a pure elemental metal.

A metal coating formed from a molten metal bath avoids some of the disadvantages found in a multiphase alloy coating. U.S. Pat. Nos. 4,407,561 and 4,418,984, issued to Wysocki and Wysocki et al., respectively, disclose a process for protecting and reinforcing a silica-glass fiber optical waveguide by coating it with either an elemental metal or an alloy. The process includes applying one or more metal coatings by passing the optical fiber through a molten pool of the metal or alloy, which may have a melting point higher than the softening point of the glass. The product is an optical fiber hermetically sealed by a metal coating. Such a coating may have a melting point well above the highest temperature the optical fiber can tolerate without degradation, and it may be composed of any of several elemental metals.

Passing the fiber through molten metal, though, also creates problems. The fiber must pass through the molten metal sufficiently rapidly that any portion of it remains immersed in the molten metal for only a brief period of time. Otherwise, the coating of solidified metal around the fiber will partially remelt, causing the finished product to have a coating too thin or with breaches. But a high fiber velocity tends to create turbulence in the molten metal, due to the metal's low viscosity. This turbulence. in turn, displaces the fiber from an optimal orientation advantageous for ensuring that the coating has a uniform thickness and therefore leads to a finished product with an irregular outside surface.

Further complications arise from the fact that an optical fiber coating produced from molten metal must cool substantially before the metaled optical fiber can safely be wound and stored. For example, Rand et al., U.S. Pat. No. 4,824,455, discloses a process for producing a polarization-preserving metal coated optical fiber. In this process a fiber composed of core and cladding passes through a bath of molten metal in which a temperature gradient exists. A metal coating results with circular cross-section but greater thickness on one side, which induces an anisotropic stress in the core. Preservation of this configuration in the coating, though, requires the coating to cool at ambient temperature. This slow cooling complicates the fabrication process, particularly when the coating must undergo substantial cooling before the coated fiber can be safely wound.

Gombert et al. have disclosed, in U.S. Pat. No. 4,853,258, a molten-metal optical fiber coating method that avoids the coating thickness variations induced by turbulence in the molten metal yet produces a metal coating sufficiently thick to protect and reinforce the enclosed optical fiber. This method suppresses the onset of turbulence in the molten metal by reducing the hydrostatic pressure on the free surface of the molten metal. Reducing the hydrostatic pressure over the molten metal entails use of a sealed coating vessel that can be substantially evacuated. This in turn requires a vacuum pump and seals at orifices where metal feedstock enters the vessel and where the optical fiber enters and exits the vessel. All of these additional requirements increase the cost of fabricating coated optical fibers with the method.

The formation of an optical fiber and application of a coating on the fiber in one continuous process also raises complications for coating the fiber with metal. Imoto et al., U.S. Pat. No. 4,123,242, discloses an apparatus for drawing an optical fiber from an optical fiber preform while maintaining a uniform fiber diameter by feedback control of the drawing tension. An increase in drawing tension reduces the diameter of the fiber as it is drawn, but it also increases the drawing speed. Thus a typical system for maintaining a uniform fiber diameter involves variations in the fiber drawing speed, but such drawing speed variations will produce variations in a metal coating applied by passing the fiber through a molten metal bath.

On the other hand, U.S. Pat. No. 4,948,406, issued to Kornmann, discloses an apparatus and process for covering an optical fiber with a metal coating having a relatively uniform thickness. The apparatus includes adjustable dies through which the fiber passes before entering and after exiting the molten metal. These dies allow the dimension of the metal-fiber contact region to be varied precisely according to the molten metal temperature, the nominal diameter of the uncoated optical fiber, and the nominal drawing speed. However, this system does not accommodate variations in the drawing speed. Moreover, it requires short fiber immersion times, which in turn requires high drawing speeds that tend to induce turbulence in the molten metal.

SUMMARY OF THE INVENTION

The present invention therefore has the object of providing an optical fiber with a coating material to prevent the optical fiber from being damaged even in the environment of high temperature and high humidity.

Another object of the present invention is to provide an optical fiber strengthened by an improved metal coating.

It is a further object of the present invention to provide an improved method for fabricating a metaled optical fiber.

It is still another object of the present invention to provide an improved method for preventing the moisture from penetrating an optical fiber in the environment of high temperature and high humidity.

It is still another object of the present invention to provide a method for continuously coating an optical fiber with a substantially pure conductive metal.

It is still another object of the present invention to provide an improved apparatus for drawing an optical fiber to be coated with a metal and an improved method therefor.

It is still another object of the present invention to provide a metaled optical fiber capable of being more readily welded directly with a metal panel.

According to one embodiment of the present invention, an apparatus for fabricating an optical fiber coated with metal may be constructed with a crucible for melting an optical fiber preform to permit an uncoated optical fiber to be drawn therefrom; a diameter measuring device for measuring a diameter of the uncoated optical fiber and providing a measurement signal representative of the diameter; an auxiliary cooler for cooling said uncoated optical fiber to a temperature substantially below the temperature at which said uncoated optical fiber is drawn from said optical fiber preform; a metal coater, adapted for coating the uncoated optical fiber with metal to prevent penetration of moisture, that defines a metal-fiber contact region in which the uncoated optical fiber is immersed in molten metal and having a dimension selected in order to provide an immersion time for the uncoated optical fiber in the range of 0.001–0.1 seconds; a temperature controller for controlling the inside temperature of the metal coater; a second cooler for slowly cooling the metaled optical fiber from a high temperature by immersion in an inert gas provided by a gas supplier mounted at one side of the cooler bottom; a capstan for drawing the uncoated optical fiber from the optical fiber preform and through the metal coater and cooler by bending a portion of the metal-coated optical fiber and rotating while in contact with that portion, thereby exerting a rotational force on that portion and in turn a tensile force on a preceding portion of the optical fiber; a capstan driver for rotationally driving the capstan; a capstan regulator for receiving measurement signals from the diameter measuring device and providing drive signals to the capstan driver in response to the measurement signals, whereby the tensile force exerted on the uncoated optical fiber being drawn from the optical fiber preform is adjusted to maintain the diameter of the uncoated optical fiber at a predetermined value; and a spool for winding the metal-coated optical fiber after it has bent around the capstan.

In an alternative embodiment of the same apparatus, the metal coater may include a metal-fiber contact region adjuster that receives adjustment signals and in accordance with them increases or decreases the dimension of the metal-fiber contact region to maintain the immersion time for the uncoated fiber at a predetermined value in the range of 0.001–0.1 second. This embodiment also includes an adjustment regulator that also receives the drive signals from the capstan regulator and provides adjustment signals to the metal-fiber contact region adjuster, whereby the metal-fiber contact region adjuster increases the dimension of the metal-fiber contact region when the drive signals direct the capstan driver to increase the tensile force and decreases the dimension of the metal-fiber contact region when the drive signals direct the capstan driver to decrease the tensile force.

In another embodiment of the invention, a metaled optical fiber is provided that includes a core for transmitting light, a cladding on the core having lower refractive index than the core, and a metal coating formed on the cladding for preventing penetration of moisture. The metal coating consists of a substantially pure metal, either copper, tin, aluminum, or other metal with similar properties, is of substantially uniform thickness, and is substantially free of flaws that could be generated through quench cooling.

According to another embodiment of the present invention, a method for fabricating a metaled optical fiber comprises the steps of drawing an uncoated optical fiber from an optical fiber preform of silica melted in a crucible, measuring the diameter of the uncoated optical fiber to have a given dimension by means of a diameter measuring device, passing the uncoated optical fiber through a metal coater containing a molten metal so that the duration of contact between the optical fiber and the molten metal is in the range of 0.001–0.1 seconds to form a metal coating of a given thickness on the uncoated optical fiber, slowly cooling the metaled optical fiber in a cooler utilizing an inert gas coolant supplied from a gas supplier mounted at an end of the cooler bottom, bending the metaled optical fiber around a capstan that is driven in accordance with measurements produced by the diameter measuring device, and winding the metaled optical fiber around a spool.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
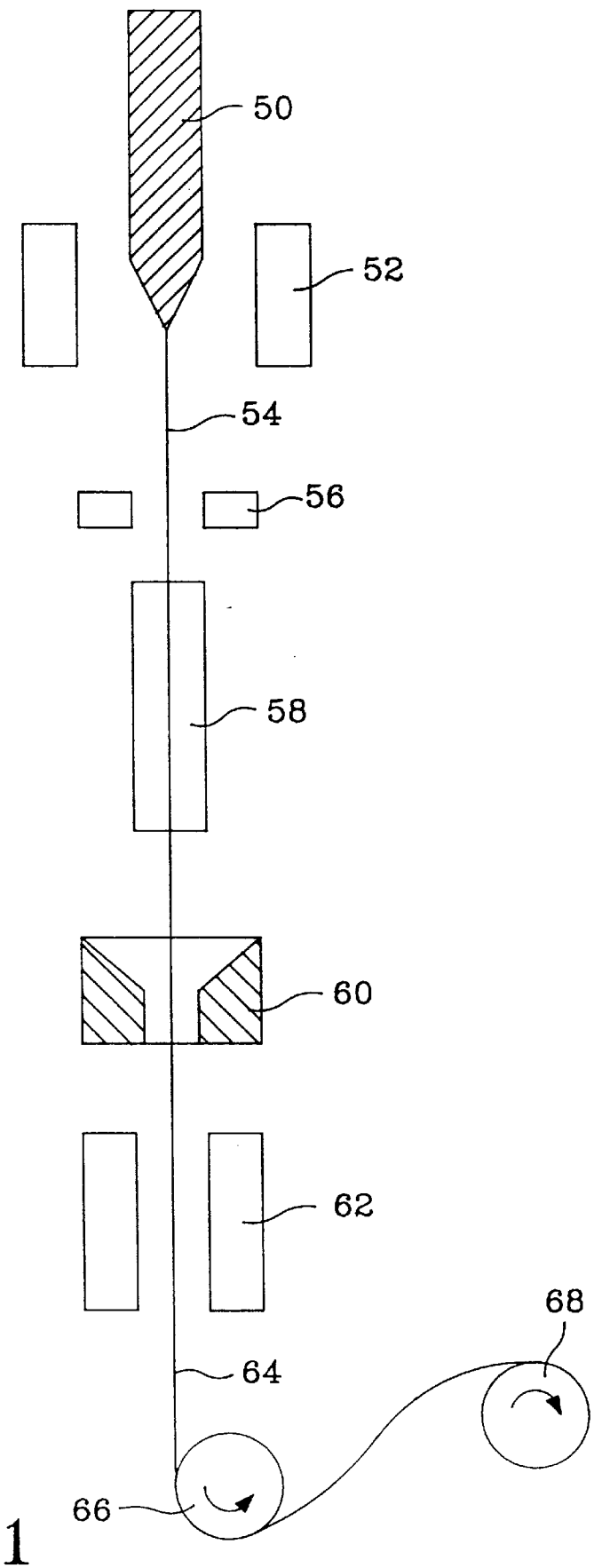
FIG. 1 is a schematic diagram for illustrating the conventional apparatus for fabricating an optical fiber coated with a resin.

Turning now to the drawings, FIG. 1 is a schematic diagram for illustrating a conventional apparatus for fabricating an optical fiber coated with a plastic resin hardened by ultraviolet light. The apparatus comprises a crucible 52 for melting the optical fiber preform 50 to draw an uncoated optical fiber 54, a diameter measuring device 56 for continuously measuring the diameter of the uncoated optical fiber 54 to keep it constant, a cooler 58 arranged below the diameter measuring device 56 for cooling the uncoated optical fiber 54 from a high temperature down to room temperature, a coater 60 for coating the uncoated optical fiber with an acrylic or a silicon resin hardened by ultraviolet light to protect it from the external environment, a hardening device 62 arranged below the coater 60 for hardening the coating on the coated optical fiber 64, a capstan 66 for drawing the optical fiber from the optical fiber preform 50 by applying a tensile force, and a spool 68 for winding the coated optical fiber 64.

In operation, the optical fiber preform 50 is slowly supplied to the crucible 52 under the control of a preform position control mechanism (not shown). The crucible 52 is operated at several thousand° C., typically 2100 to 2200° C. The uncoated optical fiber 54 is drawn from the cross-sectionally reduced part of the optical fiber preform 50. The drawing force is generated by the capstan 66.

The diameter measuring device 56 makes a measurement of the diameter of the uncoated optical fiber 54 to generate a measuring signal transferred to a diameter regulator (not shown) to regulate the diameter at a specified dimension, e.g., 125 $\mu$m. In particular, the diameter regulator controls the drawing force of the capstan 66 in response to the measuring signal so as to maintain the diameter of the uncoated optical fiber 54 at 125 $\mu$m. After being rapidly cooled by the cooler 58, the uncoated optical fiber 54 is coated with a acrylic or silicon resin as a protective coating by the coater 60. The coating on the coated optical fiber 64 is hardened by hardening device 62. Finally, the coated optical fiber 64 is wound around the spool 68.

This conventionally fabricated optical fiber, coated with a resin hardened by ultraviolet light, is very susceptible to the moisture contained in the atmosphere, so that the moisture penetrating the resin coating degrades the strength of the optical fiber 64. The fiber strength may degrade to the extent that even a weak impact to easily destroy the fiber. Moreover, such a resin cannot endure temperatures in excess of 200° C. Thus, such a conventional optical fiber 64 generally cannot be used in an environment of high temperature and high humidity.

The present invention will now be described more specifically with reference to the drawing figures, although these references are only by way of example.

Figure 2:
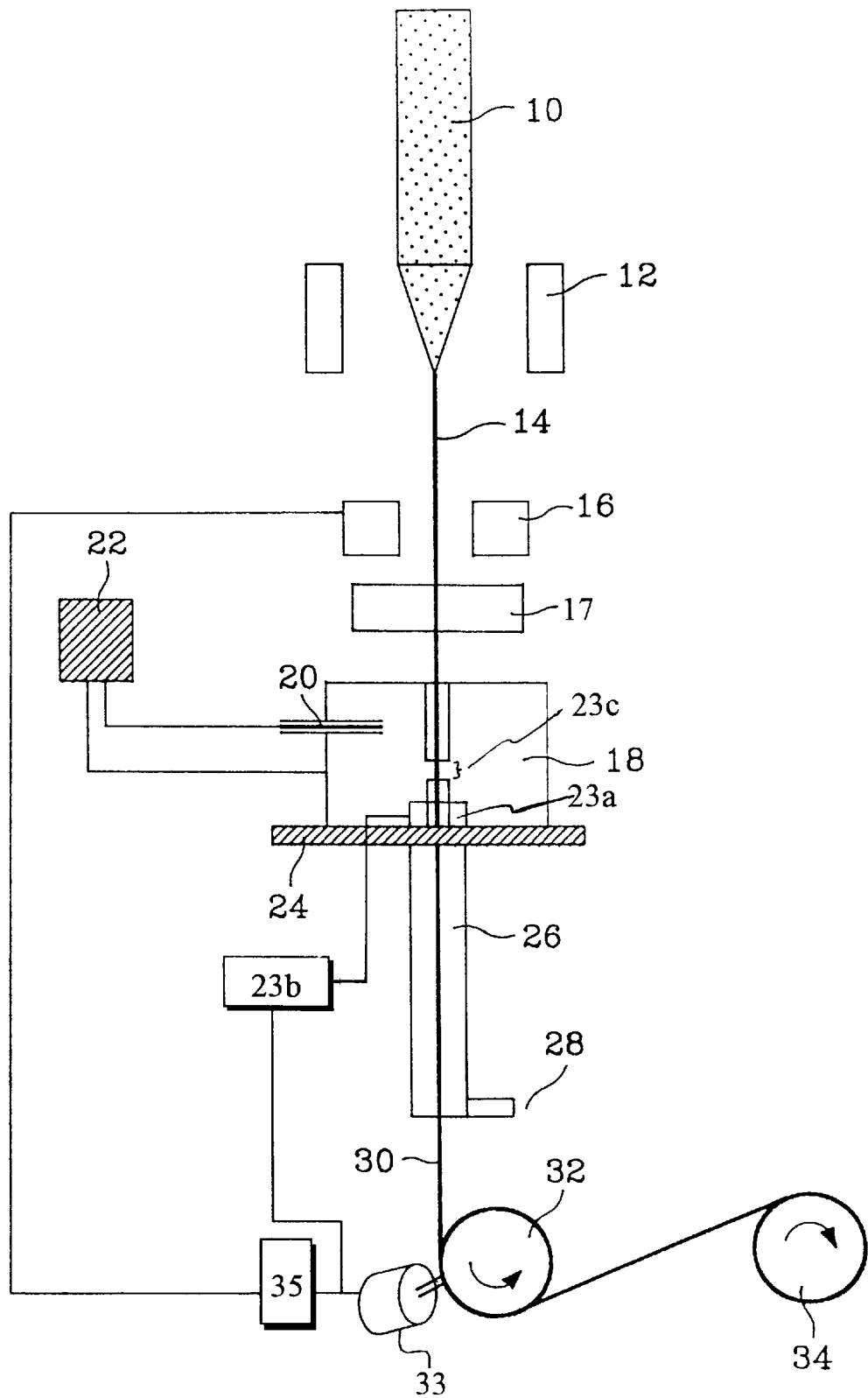
FIG. 2 is a schematic diagram for illustrating the inventive apparatus for fabricating a metaled optical fiber.
Figure 3A:
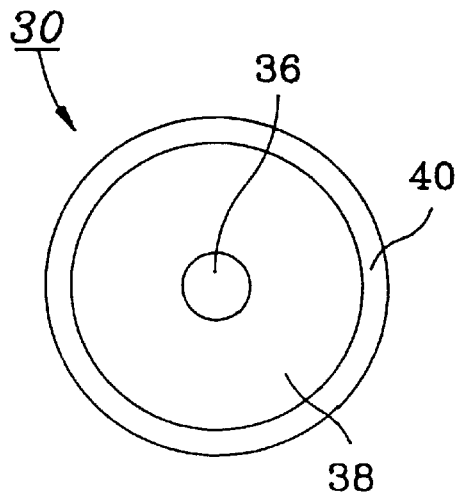
FIG. 3A is a cross sectional view of an optical fiber covered with a copper coating according to the present invention.
Figure 3B:
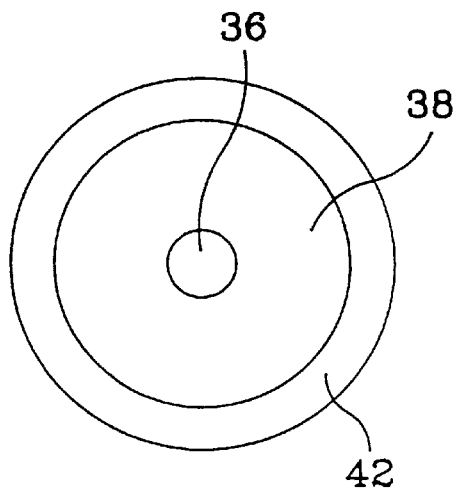
FIG. 3B is a view similar to FIG. 3A but with a tin coating.
Figure 3C:
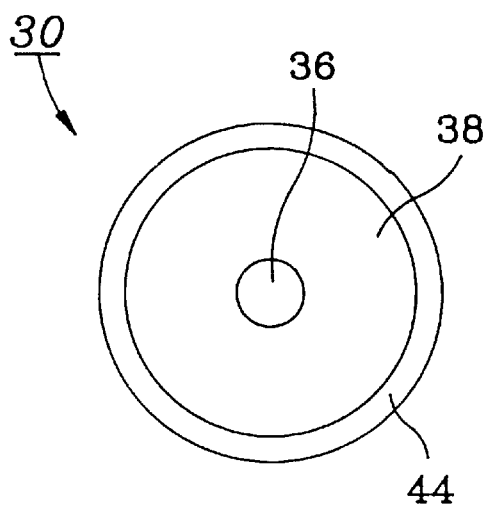
FIG. 3C is a view similar to FIGS. 3A and 3B but with an aluminum coating.

Referring to FIG. 2, an apparatus for fabricating an optical fiber coated with metal may comprise a crucible 12 for melting the optical fiber preform 10 at a high temperature (typically 2150° C.) to draw an uncoated optical fiber 14, a diameter measuring device 16 for continuously measuring the diameter of the uncoated optical fiber and generating measurement signals representative of the diameter, and a metal coater 18 for coating the uncoated optical fiber 14 with copper 40, tin 42, or aluminum 44 with the thickness of 5 $\mu$m to 50 $\mu$m to prevent penetration of moisture. FIGS. 3A, 3B and 3C illustrate the cross section of the optical fibers respectively coated with Cu, Sn and Al.

An auxiliary cooler 17 may be provided between the diameter measuring device 16 and metal coater 18 for cooling the uncoated optical fiber 14 to a temperature substantially below the temperature at which the uncoated optical fiber 14 is drawn from the optical fiber preform 10, and preferably to a room temperature of 25° C. or below, before the uncoated optical fiber 14 enters the metal coater 18. Metal coater 18 may be provided with a thermoelectric couple 20 for measuring the temperature of the molten metal to transfer the measurement signal to a temperature controller 22, which controls the inside temperature of the metal coater 18 to keep the molten metal at a constant temperature.

The metal coater 18 may include a metal-fiber contact region adjuster 23a that receives an adjustment signal from an adjustment regulator 23b and adjusts the dimension of the metal-fiber contact region 23c in response to the adjustment signal, whereby the uncoated optical fiber 14 is immersed in the molten metal for a predetermined time period in the range 0.001–0.1 second despite variations in the drawing speed. This embodiment of the invention may also include a table 24 for moving the metal coater 18 to correctly align the uncoated optical fiber 14 in the center of the metal coater.

A post-cooler 26 may be provided below the metal coater 18 to cool the metaled optical fiber 30 from a high temperature induced by immersion in the molten metal. Post-cooler 26 may include a cooling gas supplier 28 mounted at one side of the bottom of post-cooler 26 in order to supply an inert gas such as He, Ar or N as coolant to post-cooler 26.

A capstan 32 is provided to draw the optical fiber from the optical fiber preform 10 by applying a rotational force to a portion of metaled optical fiber 30 bent around capstan 32. Capstan 32 is driven by capstan driver 33. A spool 34 is arranged to wind the metaled optical is fiber 30. A capstan regulator receives the measurement signal generated by diameter measuring device 16 and provides a drive signal to capstan driver 33 in accordance with the measurement signal, whereby the drawing speed, and hence the tensile force applied to uncoated optical fiber 14, is adjusted to maintain a uniform diameter for uncoated optical fiber 14.

Describing the inventive method for fabricating an optical fiber coated with copper according to a first embodiment of the present invention, the optical fiber preform 10, made of silica or silica added with a dopant, is slowly supplied to the crucible 12 under the control of a preform position control mechanism (not shown). The crucible 12 is operated at several thousand degrees Celsius, typically 2100 to 2200° C. The uncoated optical fiber 14 is drawn from the cross-sectionally reduced part of the optical fiber preform 10. The drawing force is generated by the capstan 32.

The diameter measuring device 16 measures the diameter of the uncoated optical fiber 14 and generates a measurement signal that are transmitted to capstan regulator 35 to regulate the diameter at a predetermined value, e.g., 125 $\mu$m. In particular, the capstan regulator 35 controls the drawing force of the capstan 32 in response to the measurement signal in order to maintain the diameter of the uncoated optical fiber 14 at 125 $\mu$m.

After passing through the diameter measuring device 16, the uncoated optical fiber 14 is coated with copper 40 by of a uniform thickness by the metal coater 18 containing molten copper of 99.9% purity. The thickness of the copper coating on the uncoated optical fiber 14 is determined by the temperature of the molten copper 40 and the drawing speed of the optical fiber. This dependence results from heat transfer induced by the temperature differential between the uncoated optical fiber 14, which may have a surface temperature of about 25° C., and the molten copper 40 in the metal coater 18, which typically has a temperature of over 1085° C.

Describing this more specifically, when the cold surface of the uncoated optical fiber 14 contacts the high-temperature molten copper 40, the molten copper 40 adjacent to the uncoated optical fiber 14 solidifies onto the fiber surface. If the uncoated optical fiber contacts the molten copper for a prolonged time period, heat transfer from the molten copper 40 causes the surface temperature of the uncoated optical fiber 14 to rise. As the fiber surface temperature rises, the solidified copper begins to remelt and the volume of the copper 40 solidified onto the optical fiber 14 gradually decreases. This remelting and volume loss reduces the thickness of the copper coating. Therefore, in order to achieve a suitable thickness of the copper coating, the time period during which the uncoated optical fiber 14 contacts the molten copper 40 should be restricted to the range of 0.001–0.1 second, and more preferably to the range of 0.001–0.04 second.

Capstan regulator 35 may change the drawing speed in response to the measurement signal received from diameter measuring device 16 in order to maintain the diameter of uncoated optical fiber 14 at a predetermined value, such as 125 $\mu$m. Because the coating thickness depends in part on the drawing speed, such a change will affect the coating thickness if no compensatory action occurs. Metal coater 18 may include metal-fiber contact region adjuster 23a to provide this compensatory action by changing the linear distance over which uncoated optical fiber contacts molten copper 40.

In such a configuration, adjustment regulator 23b receives the drive signal generated by capstan regulator 35 and generates an adjustment signal in response that are received by metal-fiber contact region adjuster 23a. Metal-fiber contact region adjuster 23a adjusts the linear dimension of metal-fiber contact region 23c in response to the adjustment signal, whereby the linear distance over which uncoated optical fiber 14 contacts molten copper 40 is changed to compensate for the change in drawing speed. Metal-fiber contact region adjuster 23a thereby maintains the time period during which uncoated optical fiber 14 contacts molten copper 40 at a predetermined value despite changes in the drawing speed induced by capstan regulator 35.

Finally, metaled optical fiber 30, with its coating of copper 40, is slowly cooled by post-cooler 26, and wound around the spool 34 in accordance with the motion of capstan 32.

The present method therefore yields a metaled optical fiber 30 consisting of a core 36 for transmitting light, a cladding 38 on the core having lower refractive index than the core, and a reinforcing copper coating 40 with a thickness of 22 $\mu$m formed on the cladding for preventing penetration of moisture. The copper coating may be formed on a single mode optical fiber, scatter propagation optical fiber, multimode optical fiber, erbium added optical fiber, scatter compensation optical fiber or polarization optical fiber. Moreover, the copper coating is substantially free of internal stresses and other undesirable effects produced by a water bath or quench cooler, even though the slow cooling step takes less time and the post-cooler requires less space than are necessary for ambient-temperature cooling.

The copper coating on the optical fiber completely prevents penetration of moisture and thus degradation of the optical fiber strength. Due to its composition of pure copper, it can also efficiently transmit electrical signals, thereby providing an alternative and economical channel for communications or power transmission. Moreover, the coppered optical fiber may be used in an environment over 200° C. suffering degradation, and it has enhanced bending strength and prolonged life with consequent improved reliability.

Embodiments of the fabrication process using tin and aluminum, respectively, are similar to the process with copper. The process with tin uses molten tin of 99.9% purity and maintained in metal coater 18 at a temperature of about 235° C. The process with aluminum uses molten aluminum of 99.9% purity and maintained in metal coater 18 at a temperature of about 660° C. For both tin and aluminum, the time period for contact between uncoated optical fiber 14 and the molten metal is preferably in the range of 0.001–0.1 second, and the coating thereby produced has a thickness of 22 $\mu$m. Either tin or aluminum can be used in the process to coat single mode, scatter propagation, multimode, erbium-added, scatter compensation, or polarization optical fibers.

What we claim is:

1. An apparatus for fabricating an optical fiber coated with metal comprising:

a crucible for melting an optical fiber preform to draw an uncoated optical fiber;

a diameter measuring device for generating measurement signals by measuring a diameter of said uncoated optical fiber;

a metal coater for coating said uncoated optical fiber with molten metal forming a metal coating to prevent penetration of moisture;

a temperature controller for controlling an inside temperature of said metal coater;

a post-cooler for cooling metaled optical fiber output from said metal coater by applying an inert gas to said metaled optical fiber;

a capstan for drawing the uncoated optical fiber from said optical fiber preform by applying a rotational force in response to said measurement signals; and a spool for winding said metaled optical fiber.

2. The apparatus set forth in claim 1, said temperature controller comprising a thermoelectric couple for measuring a temperature of the molten metal in said metal coater in order to control the inside temperature of said metal coater.

3. The apparatus as set forth in claim 1, said post-cooler comprising a cooling gas supplier mounted at one side of a bottom portion of said post-cooler in order to supply said inert gas as coolant to an inner portion of said post-cooler.

4. The apparatus as set forth in claim 1, wherein said inert gas is helium.

5. The apparatus as set forth in claim 1, further comprising an auxiliary cooler provided between said diameter measuring device and said metal coater for cooling said uncoated optical fiber to room temperature before said uncoated optical fiber enters said metal coater.

6. The apparatus as set forth in claim 1, further comprising a table for moving said metal coater to correctly align said uncoated optical fiber to pass through a center portion of said metal coater.

7. The apparatus as set forth in claim 1, wherein said inert gas is argon.

8. The apparatus as set forth in claim 1, wherein said inert gas is nitrogen.

9. The apparatus as set forth in claim 1, wherein said optical fiber may be a single mode optical fiber, scatter propagation optical fiber, multimode optical fiber, erbium added optical fiber, scatter compensation optical fiber or polarization optical fiber.

10. The apparatus as set forth in claim 1, wherein said metal coating is a copper coating.

11. The apparatus as set forth in claim 10, wherein a thickness of said copper coating ranges from 5 µm to 50 µm.

12. The apparatus as set forth in claim 1, wherein said metal coating is a tin coating.

13. The apparatus as set forth in claim 12, wherein a thickness of said tin coating ranges from 5 µm to 50 µm.

14. The apparatus as set forth in claim 1, wherein said metal coating is an aluminum coating.

15. The apparatus as set forth in claim 14, wherein a thickness of said aluminum coating ranges from 5 µm to 50 µm.

16. A method for fabricating a metaled optical fiber made of silica or silica added with a dopant, comprising the steps of:

drawing an uncoated optical fiber from an optical fiber preform melted in a crucible;

controlling a drawing speed of said drawing step for regulating a diameter of said uncoated optical fiber to have a given dimension measured by means of a diameter measuring device;

passing said uncoated optical fiber through a metal coater containing a molten metal to form a metal coating of a given thickness on said uncoated optical fiber to form said metaled optical fiber;

supplying an inert gas to a cooling unit for cooling the metaled optical fiber output from said metal coater; and winding said metaled optical fiber through a capstan and around a spool.

17. The method as set forth in claim 16, further comprising a step of measuring a temperature of said molten metal for controlling an inside temperature of said metal coater to maintain said temperature of said molten metal at a constant level.

18. The method as set forth in claim 16, further comprising a step of controlling a time period for said uncoated optical fiber to remain in contact with said molten metal in said metal coater in response to a measurement signal indicative of said diameter of said uncoated optical fiber measured by said diameter measuring device, said time period being between 0.001 sec. to 0.1 sec.

19. The method as set forth in claim 16, wherein said molten metal is molten copper and said metaled optical fiber is a copper coated optical fiber.

20. The method as set forth in claim 19, wherein the temperature of said molten copper in said metal coater is in the range of 1083° C. to 1110° C.

21. The method as set forth in claim 16, wherein said molten metal is molten tin and said metaled optical fiber is a tin coated optical fiber.

22. The method as set forth in claim 21, wherein the temperature of said molten tin in said metal coater is in the range of 231° C. to 260° C.

23. The method as set forth in claim 16, wherein said molten metal is molten aluminum and said metaled optical fiber is an aluminum coated optical fiber.

24. The method as set forth in claim 21, wherein the temperature of said molten aluminum in said metal coater is in the range of 660° C. to 690° C.

25. An apparatus for fabricating a metaled optical fiber, comprising:

a crucible for melting an optical fiber preform and enabling an uncoated optical fiber to be drawn therefrom;

a diameter measuring device for measuring a diameter of said uncoated optical fiber and providing a measurement signal representative of said diameter;

a metal coater containing a quantity of molten metal and adapted to coat said uncoated optical fiber with metal, said metal coater defining a metal-fiber contact region in which said uncoated optical fiber is passed through said molten metal, forming a metal coating on said uncoated opticla fiber, wherein said metal-fiber contact region is adjustable in response to said measurement signal to provide for immersion of said uncoated optical fiber in said molten metal for a predetermined time period;

a temperature controller for controlling an inside temperature of the metal coater;

a post-cooler for applying an inert gas to the metaled optical fiber output from said metal coater for slowly cooling said metaled optical fiber output at a high temperature from said metal coater;

a capstan for drawing said uncoated optical fiber from said optical fiber preform by rotating while in contact with a portion of said metaled optical fiber, said capstan imparting a tensile force to a preceding portion of said metaled optical fiber;

a capstan regulator responsive to said measurement signal for generating a drive signal;

a capstan driver for rotationally driving said capstan in response to said drive signal to maintain said diameter of said uncoated optical fiber at a predetermined value;

a spool for winding said metaled optical fiber after said metaled optical fiber has contacted said capstan.

26. The apparatus as set forth in claim 25, further comprising an auxiliary cooler for cooling said uncoated optical fiber to room temperature before said metal coater coats said uncoated optical fiber with metal.

27. The apparatus as set forth in claim 25, said temperature controller comprising a thermoelectric couple for measuring a temperature of said molten metal and generating a temperature signal representative of said temperature for controlling said inside temperature signal of said metal coater maintained said inside temperature within a predefined temperature range.

28. The apparatus as set forth in claim 25, said post-cooler comprising a cooling gas supplier mounted at one side thereof for supplying said inert gas.

29. The apparatus as set forth in claim 25, further comprising:

an adjustment regulator responsive to said drive signal for generating an adjustment signal and a metal-fiber contact region adjuster within said metal coater, said metal-fiber contact region adjuster being responsive to said adjustment signal for adjusting a metal-fiber contact region to maintain said immersion of said uncoated optical fiber in said molten metal for said predetermined time period.

30. The apparatus as set forth in claim 25, wherein said predetermined time period has a range between 0.001 second to 0.1 second.

31. The apparatus as set forth in claim 25, wherein said predetermined time period has a range between 0.01 second to 0.04 second.

32. The apparatus as set forth in claim 29, wherein said predetermined time period has a range between 0.001 second to 0.1 second.

33. The apparatus as set forth in claim 29, wherein said predetermined time period has a range between 0.01 second to 0.04 second.

34. The apparatus as set forth in claim 25, wherein said inert gas coolant is helium.

35. The apparatus as set forth in claim 25, wherein said inert gas is argon.

36. The apparatus as set forth in claim 25, wherein said inert gas is argon.

37. The apparatus as set forth in claim 25, wherein said inert gas is nitrogen.

38. The apparatus as set forth in claim 25, wherein said metal coating has a thickness between 5 $\mu$m to 50 $\mu$m.

39. The apparatus as set forth in claim 30, wherein said metal coating has a thickness between 5 $\mu$m to 50 $\mu$m.

40. The apparatus as set forth in claim 31, wherein said metal coating has a thickness between 5 $\mu$m to 50 $\mu$m.

41. The apparatus as set forth in claim 32, wherein said metal coating has a thickness between 5 $\mu$m to 50 $\mu$m.

42. The method as set forth in claim 18, said step of controlling said time period comprising a step of adjusting a metal-fiber contact region within said metal coater, said uncoated optical fiber being immersed in said molten metal for said time period.

* * * * *